UNITED STATES PATENT OFFICE.

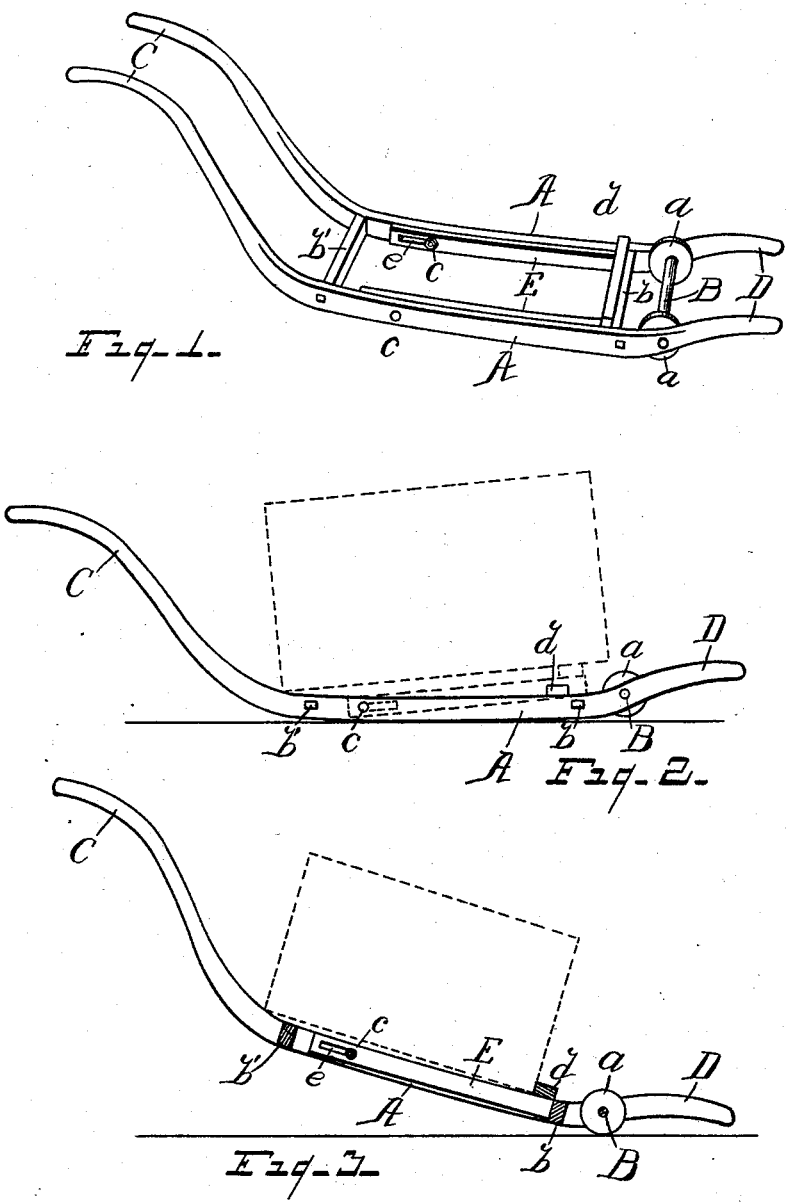

ALMA BEDFORD, OF COLDWATER, MICHIGAN.

COMBINED TRUCK AND BAGGAGE-CARRIER.

SPECIFICATION forming part of Letters Patent No. 539,851, dated May 28, 1895.

Application filed July 25, 1894. Serial No. 518,585. (No model.)

*To all whom it may concern:*

Be it known that I, ALMA BEDFORD, a citizen of the United States, residing at Coldwater, in the county of Branch, State of Michigan, have invented certain new and useful Improvements in a Combined Truck and Baggage-Carrier; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to a combined truck and baggage carrier, and consists in a certain construction and arrangement of parts as hereinafter fully set forth, the essential features of which being pointed out particularly in the claims.

The object of the invention is to provide a combined carrier and truck, upon which heavy boxes or pieces of baggage may be easily carried up or down a flight of stairs, or transported from place to place along the halls or floors of a building. This object is attained by the construction illustrated in the accompanying drawings, in which—

Figure 1 is a perspective view of my improved device. Fig. 2 is a side elevation showing by stipple-lines the adjustment of the movable frame and a box supported thereon. Fig. 3 is a longitudinal section through the frame, showing the position of the parts when serving as a truck.

Referring to the letters of reference, A designates the main bars of the frame, which are parallel and are coupled by the cross bars $b$, $b'$. Said bars A, at one end, are bent upward and rearward forming the long curved handles C, and at the other end are given a short upward curve, forming the shorter handles D.

Secured between the handles D near the base of their curved portion, is a shaft B, upon which the truck wheels $a$ are journaled. By this slight elevation of said shaft the wheels $a$ are raised sufficiently to carry them free from the floor, when the straight portions of the bars of the frame are lying upon the floor or in a horizontal position, as shown in Fig. 2, so that when a heavy box or trunk is thrown upon the truck, the force thereof does not come upon said wheels and shaft. The position of said wheels, however, being such, that by raising the handles C, said wheels are brought to bear upon the floor, thus carrying the truck frame clear thereof and enabling the truck to be moved from place to place with its load upon said wheels, as clearly shown in Fig. 3.

Lying adjacent to the inner face of the bars A of the frame, are the bars E of an auxiliary frame, one end of which is pivoted to the bars A by means of bolts $c$ that pass through the slots $e$ in said bars E, the free ends of which are connected by the cross bar $d$, which is secured to the upper edges of the bars E, and extends at its ends onto the bars A, whereby the free end of the auxiliary frame is prevented from dropping through the frame of the truck. When this auxiliary frame is in its normal position, cross bar $d$ serves as a stop against which a box or trunk may rest, to prevent it from sliding onto the wheels while being transported upon said truck, as shown in Fig. 2, and when desired, said pivoted frame may be raised and drawn forward the distance of the length of the slots in the bars E, so that said bars will rest upon the cross bar $b$, thereby raising the bed of the truck so that a longer piece of baggage may be placed thereon and supported free from the wheels $a$, as clearly shown by stipple lines in Fig. 2.

The peculiar shape of this truck renders it particularly adapted for carrying baggage up or down a flight of stairs, so as to maintain it in a horizontal position, and to distribute the weight equally between the persons carrying the truck, as the long and upwardly curved handles C being grasped by the person at the greater height upon the stairs permit the bed of the truck to depend on a line with the handles D carried by the person, in the lower position, and in case the stairs are unusually steep, the lower end of the truck may be raised by means of the auxiliary frame to compensate therefor.

Having thus fully set forth my invention, what I claim as new, and desire to secure by Letters Patent, is—

1. In a device for the purpose set forth, the combination of the parallel bars consisting of a straight portion having the long upwardly curved handles at one end and the shorter upwardly curved handles at the opposite end, the wheels journaled to said shorter handles so that their tread shall stand slightly above the lower edge of the straight portion of said bars.

2. In a device for the purpose specified, the combination of the straight, parallel bars terminating at each end in the extended upwardly curved handles which handles at one end are longer than at the other end of said bars, the wheels journaled to the shorter handles of said bars, the auxiliary frame pivoted to said bars adjacent to the longer handles and adapted to move longitudinally.

In testimony whereof I affix my signature in presence of two witnesses.

ALMA BEDFORD.

Witnesses:
 JOSEPH H. MONTAGUE,
 ELMER E. KILLINGER.